July 13, 1971  J. H. BALLARD ET AL  3,592,612
TWO-STAGE APPARATUS FOR MIXING FLUIDS IN
CONCURRENT DOWNFLOW RELATIONSHIP
Filed Nov. 2, 1966  2 Sheets-Sheet 1

INVENTORS
JOHN H. BALLARD
ROLAND F. DEERING
BY
Dean Sandford
ATTORNEY

United States Patent Office 3,592,612
Patented July 13, 1971

3,592,612
TWO-STAGE APPARATUS FOR MIXING FLUIDS IN CONCURRENT DOWNFLOW RELATIONSHIP
John H. Ballard, 10340 Bogardus Ave., Whittier, Calif. 90603, and Roland F. Deering, 1100 Circle Drive, La Habra, Calif. 96301
Filed Nov. 2, 1966, Ser. No. 591,615
Int. Cl. B01f 3/04, 5/06
U.S. Cl. 23—288    11 Claims

ABSTRACT OF THE DISCLOSURE

A two-stage fluid mixing device comprising a horizontal tray adapted for installation in a downflow contacting vessel and having a first stage mixing box mounted on its upper surface, a second stage mixing box attached to its under surface and at least two spaced apertures in the tray communicating the mixing boxes. Fluids flowing downwardly within the contacting vessel pass serially through the first stage mixing box, through the apertures in the tray, and then through the second stage mixing box. The contacting vessel includes a horizontal perforate tray extending across the cross-section of the vessel and located immediately below and proximate the mixing device. A horizontal bubble cap tray containing a plurality of downcomers is placed in spaced relationship below the perforated tray and above the solids bed. Each of the downcomers is surmounted by a bubble cap. A plurality of particulate solids bed is positioned in spaced relationship with the mixing device above each of the beds. In one embodiment an intermediate fluid inlet pipe is positioned above the tray and mixing device for introducing fluid into the vessel. In another preferred embodiment an intermediate fluid inlet pipe is located in the annular area between the first stage mixing box and the shell of the vessel. The fluid inlet pipe does not rise substantially above the top of the first mixing box.

This invention relates generally to the mixing of fluids in concurrent downflow relationship, and more particularly to an improved apparatus for mixing fluids flowing downwardly in a fixed bed downflow contacting vessel. This apparatus is particularly adapted for mixing gas and liquid flowing downwardly in concurrent relationship.

Many commercial processes require the intimate mixing of fluids in generally downflow relationship, and particularly the mixing or contacting of a liquid with a gas. For example, in processes involving the physical or chemical treatment of hydrocarbons and other organic materials, it is often advantageous to contact two-phase mixtures of liquids and gases or vapors with fixed beds of granular contact materials, and particularly with fixed beds of particle-form solids having catalytic activity. Although a two-phase feed mixture can be intimately mixed by conventional means prior to introduction to the bed of solid contact material, separation of the gas and liquid can thereafter occur in the contact bed resulting in channelling and other undesirable effects. It is therefore necessary that the downflowing liquid and gaseous fluids be remixed and redistributed uniformly over the horizontal cross-section of the contact bed. In another aspect, it is frequently advantageous to introduce additional liquid or gaseous fluids at intermediate points in the vertical length of the contact bed. Where the introduced fluid is at a different physical or chemical condition than the downflowing fluids at the point of introduction, it is usually advantageous that these fluids be intimately admixed prior to their being passed to subsequent contacting zones. Thorough mixing and uniform distribution is particularly essential in the case of downflow catalytic reactors, since the increased efficiency resulting therefrom can materially reduce the quantity of catalyst required and the size of the reactor vessel.

Apparatus for effecting the mixing of the liquid and gaseous fluids in a fixed bed downflow contacting device is proposed in U.S. Pat. No. 3,218,249. This apparatus includes a horizontal solid tray extending over the cross-section of the vertical contacting vessel. Appended immediately below the tray and attached thereto is a mixing box. Two relatively large diameter apertures in the tray open into the mixing box. The outlet from the mixing box also comprises two large apertures in the bottom of the box offset 90 degrees from the inlet apertures. Gases and liquids discharged from the mixing box are distributed over the cross-section of the vessel by means of a perforated tray located below the mixing box and a bubble cap distribution tray positioned below the perforated tray. Although the patented apparatus is a marked improvement over prior art devices for this service, and affords satisfactory results in many applications, even more complete mixing is sometimes advantageous in certain extremely critical applications, such as in the catalytic hydrofining of hydrocarbons, then can be effected with the patented device. While increased mixing can be obtained by installing additional collection trays having mixing boxes appended thereunder, so as to achieve multistage mixing, this alternative is usually undesirable as additional vessel space is required to house the additional apparatus.

Accordingly, an object of the present invention is to provide an improved device for the mixing of fluids in concurrent downflow relationship. Another object of this invention is to provide means for effecting the substantially complete mixture of gas and liquid flowing downwardly in concurrent relationship. Still another object is to provide an improved means for effecting interstage gas and liquid mixing in a downflow contacting vessel which do not require increased vessel space for installation. A further object is to provide improved means for introducing a fluid into a mixture of liquid and gas flowing downwardly in a contact vessel which do not require additional vessel space. A still further object is to provide a compact means for improving the efficiency of a mixed fluid phase downflow contacting operation. These and other objects will be apparent to those skilled in the art from the following description.

Briefly, the present invention involves an improved fluid mixing apparatus for use in a downflow contacting device. The salient feature of this invention is the addition of a first stage mixing box above the collection tray of the patented fluid mixing apparatus to function in combination with the mixing box appended to the underside of the tray. Fluids flowing downwardly within the contacting vessel pass in series through the first stage mixing box, through apertures in the collection tray, and then through the second stage mixing box. Thus, improved mixing of the downflowing fluid is obtained with the multistage apparatus. In most applications, the first stage mixing box can be installed in available vessel space. The improved mixing device of this invention is particularly adapted for use in combination with means for distributing the admixed fluids over the cross-section of a contacting vessel.

The invention will be more readily understood by reference to the following detailed description and the accompanying drawings, of which:

It is to be understood that although the fluid distribution apparatus of this invention is broadly applicable to any downflow contacting system, it is particularly useful in catalytic reaction systems. For example, the device has specified application in the catalytic treatment of hydrocarbons, and particularly in mixed phase catalytic treatments, such as catalytic hydrodesulfurization and hydrocracking. Other catalytic processes in which the mixing device of this invention has particular utility are the catalytic polymerization, isomerization and reforming of petroleum hydrocarbons, catalytic hydrogenation of liquid coal extracts, catalytic hydrogenation of aromatic compounds, such as the conversion of benzene to cyclohexane, catalytic oxidation, catalytic chlorination, and the like. It is to be further understood that references to gas or gases, unless otherwise specifically stated, includes both permanent gases, such as hydrogen, oxygen and nitrogen, and also components in the vapor state under the contacting conditions.

Figure 1:
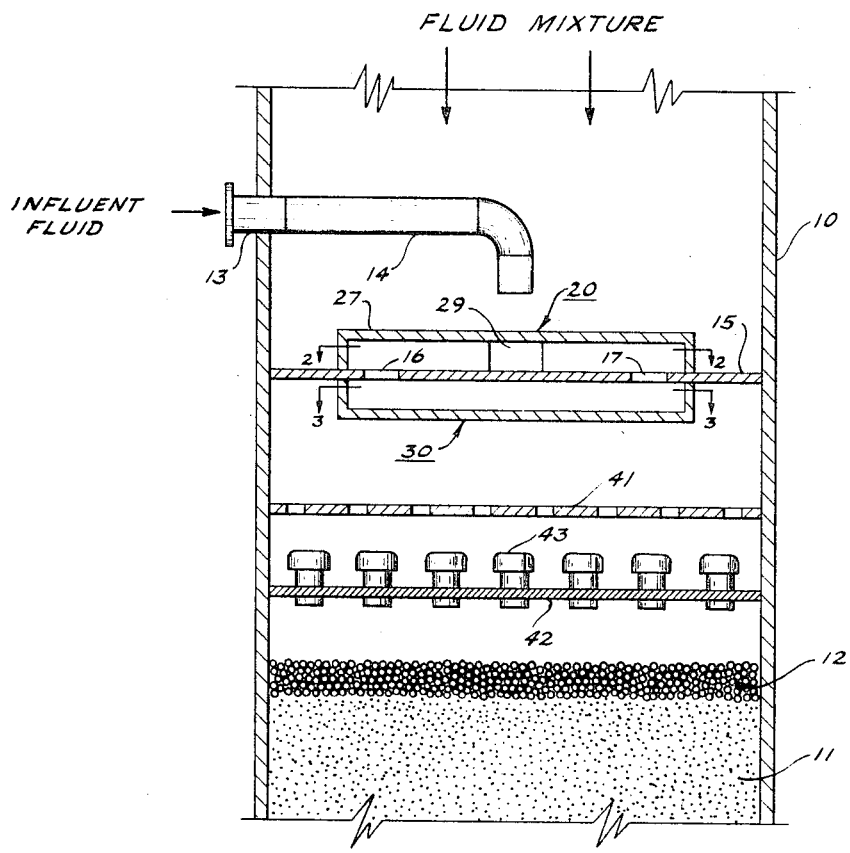
FIG. 1 is an elevation view of a section of a fixed solids be downflow contacting vessel, in cross-section, illustrating the installation of the improved mixing apparatus of this invention.
Figure 2:
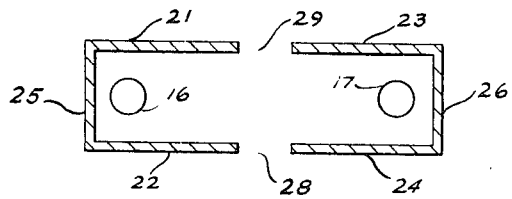
FIG. 2 is a cross-sectional plan view of the upper mixing box, taken along the line 2—2 of FIG. 1.
Figure 3:
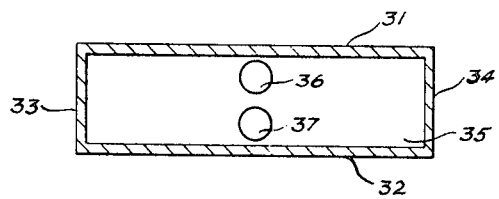
FIG. 3 is a cross-sectional plan view of the lower mixing box, taken along the line 3—3 of FIG. 1.

The general arrangement of a mixing apparatus in a downflow contacting device according to one embodiment of this invention is illustrated in FIGS. 1, 2, and 3. Typical of such contacting devices are downflow catalytic reactors in which a fluid flows generally downwardly through the vessel, passing through and contacting one or more beds of particle-form solids, such as beds of solid catalyst granules. Fluids can be added or withdrawn intermediate the contact bed, where desired. The mixing device of this invention is adapted for installation in the top of a downflow contacting vessel for pre-mixing fluid feed to a contacting zone or, alternatively, the device may be installed intermediate two contacting zones. Accordingly, the contact media may comprise a plurality of contact beds, and mixing devices according to this invention can be located above one or more of these beds. Although the fluid mixing apparatus of this invention can be installed in a vessel of any size and cross-sectional configuration, a vertical cylindrical vessel having a length greater than its diameter is conventionally employed in many fluid contacting applications.

Figure 4:
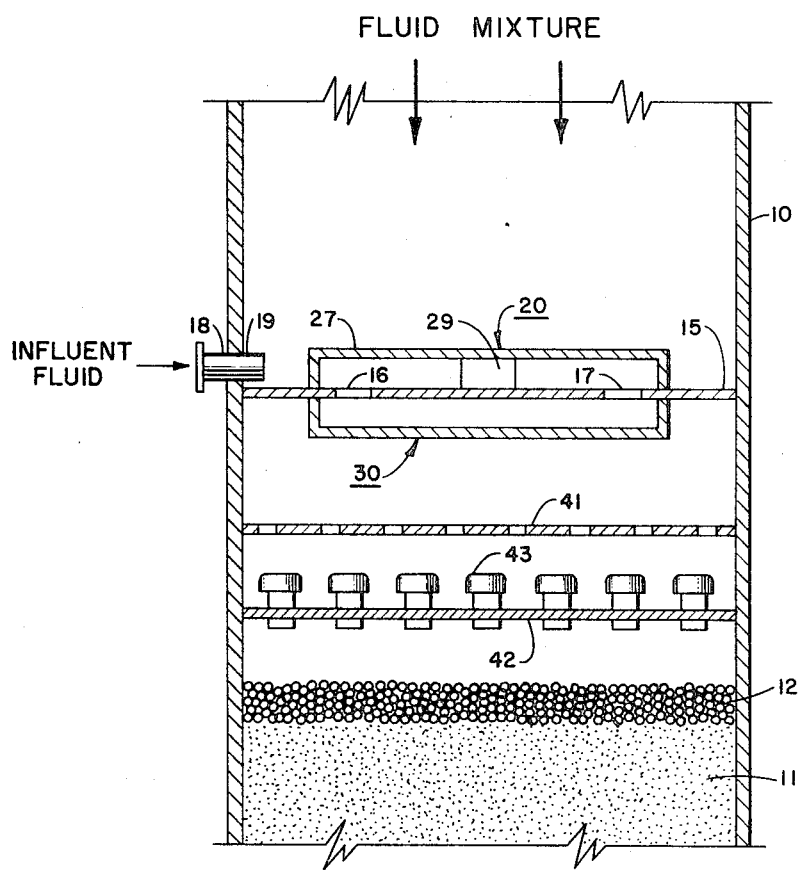
FIG. 4 is an elevation view in section of another embodiment of the apparatus of this invention installed in a contacting vessel.

With particular reference to FIG. 1, there is shown a section of a downflow contacting device comprising cylindrical vertical shell 10 containing a bed of granular contact particles 11. In many applications, it is desirable to overlay particle bed 11 with a layer of chemically inert spherical particles 12, such as ceramic balls of fused alumina, or the like. These chemically inert particles are preferably of larger size than the particles of bed 11, and act to prevent impingement of the downflowing fluids directly onto the particle bed 11, thus preventing disruption of the upper surface of the particle bed and reducing attrition of these particles. Fluids, such as mixtures of liquids and gases, flow downwardly from a fluid inlet, not shown, located in an upper part of the vessel, or the downflowing fluids can be the effluent from an upper contacting zone. Where desired, a fluid can be introduced into the contacting vessel by means of nozzle 13 and internal pipe 14. While the internal pipe 13 is illustrated as comprising a downwardly directed ell, other arrangements of fluid conduits can be employed, one preferred fluid injection nozzle being disclosed in our copending application Ser. No. 445,380, filed Apr. 5, 1965, now matured into U.S. Pat. No. 3,342,193. Further, it may be desirable to install internal pipe 14 in the annular space between the mixing box and the vessel shell to avoid the necessity of providing additional vessel height for this purpose, it being realized, however, that the introduction of the fluids in a symmetrical pattern is of prime importance. Thus, in a preferred embodiment illustrated in FIG. 4, the fluid inlet means, such as nozzle 18 and internal pipe 19, are positioned in the annular space between mixing box 20 and shell 10, these means not rising substantially above the top of the mixing box.

Collection tray 15 extends across the cross-section of the contacting vessel, and serves to direct the downflowing fluids through two spaced apertures 16 and 17 therein. Apertures 16 and 17 are preferably located equidistant from the center axis of the vessel and are spaced approximately 180 degrees about the center axis. Tray 15 can be removably attached around its periphery to the shell 10 by means capable of a substantially leak-free seal. Alternatively, and especially in larger diameter vessels, tray 15 is formed in sections and supported upon a beam structure attached to the shell 10. These sections can be permanently attached, as by welding; however, in such construction, it is preferred to leave at least one removable section to provide access through the vessel for cleaning and maintenance.

The apertures 16 and 17 in tray 15 are located within the upper mixing box 20 which is attached to the upper surface of the tray by welding, or other means, thus occupying vessel space otherwise usually available and not requiring additional vessel volume. Although not limited as to shape, the mixing box 20 must be of sufficient size and shape to cover the apertures 16 and 17, and can conveniently comprise a generally rectangular configurationb. However, despite the particular shape of mixing box employed, the box is provided with side openings for inlet of fluid into the box. Preferably, two opposed inlet openings are provided on opposite sides of the box and oriented 90 degrees from the apertures 16 and 17 in tray 15. As illustrated in FIG. 2, the mixing box can be an elongated rectangle formed by the side members 21, 22, 23 and 24, the end members 25 and 26, and the top member 27. The side members are arranged to provide inlet openings 28 and 29 approximately at the midpoint of each of the elongated sides. The mixing box 20 is oriented so that these inlet openings are offset 90 degrees from the apertures 16 and 17 in tray 15. The box 20 can be constructed from separate pieces, or can be integrally formed from a single sheet by conventional cutting and bending techniques.

The apparatus of this invention includes a mixing box 30 appended to the bottom of tray 15 to provide the final mixing stage. Mixing box 30 is adapted to receive fluids flowing downwardly through the apertures 16 and 17 in tray 15, and to discharge these fluids through a plurality of outlet openings. The mixing box 30 can be of any desired size and configuration so long as it is adapted to receive the fluids passing through the apertures in tray 15. The size and configuration of the mixing box 30 need not coincide with that of the mixing box 20, so long as the apertures 16 and 17 provide fluid communication between both boxes. Specifically, the box can be of a design in accordance with that disclosed in U.S. Pat. No. 3,218,249, or of the improved design disclosed in application Ser. No. 591,476 filed concurrently herewith now U.S. Pat. No. 3,502,445.

One embodiment of a suitable second stage mixing box is illustrated in FIG. 3, wherein is seen an elongated rectangular mixing box formed by the side members 31 and 32, the end members 33 and 34, and bottom member 35. Bottom member 35 is provided with relatively large diameter openings 36 and 37, preferably arranged on a center line normal to the longitudinal axis of the box and spaced approximately equidistantly on either side of the longitudinal axis. The box can also include internal flow directing means disclosed in the aforementioned copending application and, alternatively, can also include side outlet openings as also disclosed therein.

The above-described mixing device is conventionally employed with a distribution means such as the perforated tray 41 and distribution tray 42 having a plurality of downcomer and bubble cap assemblies 43 thereon. As is more fully described in U.S. Pat. No. 3,218,249, the distribution means are located below the tray 15 and above the upper surface of the particulate solids bed.

The novel feature of the present invention is addition of a mixing box above the collection tray to provide an additional stage of fluid mixing which does not require additional vessel space. In operation, fluids passing downwardly through the shell 10 are divided into two streams of more or less similar compositions and flow quantities passing through the two opposed side inlet openings 28 and 29 of mixing box 20. With the type of opening illustrated, no substantial reservoir of liquid accumulates on the tray 15. The two fluid streams passing through the opposed openings 28 and 29 impinge in the interior of mixing box 20 whereupon the first stage of the mixing operation occurs. The admixed fluid in agin divided into two streams of approximately equal composition and flow quantity, each of these streams passing through one of the openings 16 and 17 in tray 15 and into the mixing box 30. Each of these fluid streams is then recombined within the box 30 prior to exiting through either of the outlet openings 36 and 37. Mixing within the box 30 can be improved by the use of flow directing means to cause the entering fluid streams to impinge in a turbulent mixing zone adjacent the outlet openings. In either case, the admixed fluids are then substantially uniformly distributed over the cross-section of the vessel by distribution means located below the tray 15.

Mixing and distribution of a downflowing fluid can be materially improved in many applications by utilization of a two-stage mixing apparatus and distribution means according to the various embodiments of apparatus heretofore described. This improved mixing and distribution is manifested by greater uniformity in the chemical composition and physical condition of fluid exiting the distribution means. A further important advantage of the configuration of mixing apparatus of this invention is that the two-stage mixing box can be installed above the collection tray in otherwise available space, without the necessity of increasing the vessel height.

While particular embodiments of the invention have been described, it will be understood, of course, that the invention is not limited thereto since many modifications can be made and it is intended to include within the invention any such modifications as fall within the scope of the claims.

The invention having thus been described, we claim:

1. In combination with a contacting vessel, an apparatus for mixing a substantially downflowing fluid mixture, which comprises:
   a horizontal tray extending across the cross-section of said vessel and having at least two apertures therethrough;
   a first closed mixing box attached to the top of said tray and covering the section of said tray containing said apertures so that the interior of said box is in fluid communication with said apertures, said box having vertical side walls and at least two opposed inlet openings in said vertical side walls;
   a second mixing box attached to the underside of said tray, said apertures in said tray opening into said second mixing box, and said second mixing box having at least two exit openings.

2. The apparatus defined in claim 1 wherein said inlet openings extend to the upper surface of said tray.

3. The apparatus defined in claim 1 wherein said apertures in said tray are located equidistant from a center axis of said vessel and are spaced equidistant about said center axis, and wherein said inlet openings in said first mixing box are located equidistant from said center axis of said vessel and are uniformly offset about said center axis from said apertures in said tray.

4. In combination with a contacting vessel containing a particulate solids bed, an apparatus for mixing and distributing a substantially downflowing fluid mixture, whch comprises:
   a horizontal tray extending across the cross-section of said vessel above said particulate solids bed, said tray having at least two openings therethrough located equidistant from a center axis of said vessel and spaced equidistant about said center axis;
   a first closed rectangular mixing box attached to the top of said tray concentrically therewith and so that said apertures in said tray open into the interior of said box, said first mixing box having an inlet opening at about the midpoint of each of two parallel sides, said openings being opposed to each other;
   a second mixing box attached to the under side of said tray, said apertures in said tray opening into said second mixing box, and said second mixing box having at least two exit openings located equidistant from said center axis of said vessel and uniformly offet about said center axis from said openings in said tray; and
   ditribution means located below the said horizontal tray and above the said particulate solids bed for distributing the downflowing fluids uniformly over the cross-section of the bed.

5. The apparatus defined in claim 4 wherein said inlet openings extend to the upper surface of said tray.

6. The apparatus defined in claim 5 including an intermediate fluid inlet means for injecting fluid into said vessel above said tray.

7. The apparatus defined in claim 5 including a plurality of particulate solids beds in spaced relationship and having said mixing and distribution apparatus above each of said beds.

8. In combination with a contacting vessel containing a particulate solids bed, an apparatus for mixing and distributing a substantially downflowing fluid mixture, which comprises:
   a horizontal tray extending across the cross-section of said vessel above said particulate solids bed, said tray having two apertures therethrough located equidistant from the center axis of said vessel and spaced 180 degrees about said center axis;
   a first elongated rectangular mixing box attached to the top of said tray concentric therewith, said mixing box having elongated side members, end members and a top member, and said tray serving as a bottom member of said box, said apertures in said tray opening into said mixing box adjacent the ends of said box, and said box having an inlet opening at the midpoint of each of the elongated side members extending downwardly to the upper surface of said tray;
   A second mixing box attached to the under side of said tray, said apertures in said tray opening into said second mixing box, and said second mixing box having at least two exit openings located equidistant from said center axis of said vessel and uniformly offset about said center axis from said apertures in said tray;
   a horizontal perforate tray extending across the cross-section of said vessel located immediately below and proximate said mixing box; and
   a horizontal bubble cap tray containing a plurality of downcomer means, each of said downcomer means being surmounted by a bubble cap and said tray being placed in spaced relationship below said perforate tray and above said particulate solids bed.

9. The apparatus defined in claim 8 including a plurality of particulate solids beds in spaced relationship and having said mixing and distribution apparatus above each of said beds.

10. The apparatus defined in claim 8 including an intermediate fluid inlet means for introducing fluid into said vessel above said tray having said first and second mixing boxes attached thereto.

11. The apparatus defined in claim 10 wherein said intermediate fluid inlet means is located in an annular area between said first mixing box and the shell of said vessel, said means not rising substantially above the top of said first mixing box.

References Cited

UNITED STATES PATENTS

| 3,363,843 | 1/1968 | Ballard et al. | 261—97X |
|---|---|---|---|
| 3,158,171 | 11/1964 | Eckert | 261—97UX |
| 3,218,249 | 11/1965 | Ballard et al. | 23—288X |

FOREIGN PATENTS

| 895,147 | 11/1953 | Germany | 261—113 |
|---|---|---|---|

RONALD R. WEAVER, Primary Examiner

U.S. Cl. X.R.

23—284, 285; 208—108; 261—97, 110, 111